United States Patent
Beschke et al.

[15] 3,656,981
[45] Apr. 18, 1972

[54] PRODUCTION OF FINELY DIVIDED ORGANICALLY MODIFIED SILICAS

[72] Inventors: Helmut Beschke, Frankfurt/Main; Hans Pfleger, Neu Isenburg; Horst Ferch, Bruchkobel; Edith Eisenmenger, Offenbach/Main, all of Germany

[73] Assignee: Deutsche Gold-Und Silber-Schneideanstalt vormals Roessler, Frankfurt am Main, Germany

[22] Filed: Apr. 24, 1970

[21] Appl. No.: 31,737

Related U.S. Application Data

[63] Continuation-in-part of Ser. No. 646,452, June 16, 1967.

[30] Foreign Application Priority Data

June 18, 1966 Germany..............................D 50343

[52] U.S. Cl. ....................106/288 B, 106/308 Q, 106/308 N
[51] Int. Cl. ..........................................................C09c 3/00
[58] Field of Search....................106/288, 308 O, 308 N, 309

[56] References Cited

UNITED STATES PATENTS 3,455,718   7/1969   Dithmar et al. .....................106/308 N Primary Examiner—James E. Poer
Attorney—Michael S. Striker

[57] ABSTRACT

A finely divided organically modified silica is formed by adding an inorganic acid at an elevated temperature to an aqueous alkali methyl silicate solution in contact with a water-soluble reactive organic polymer which is present in an amount of from about 3 to about 24 percent by weight relative to the weight of the thus precipitated silica.

6 Claims, No Drawings ized silicas by precipitation from silicate solutions which leads to products which are susceptible to a number of organic reactions.

PRODUCTION OF FINELY DIVIDED ORGANICALLY MODIFIED SILICAS

CROSS-REFERENCE TO RELATED APPLICATION

This application is a continuation-in-part of application Ser. No. 646,452, filed June 16, 1967 by the same inventors in respect of "Production of Finely Divided Organically Modified Silicas."

BACKGROUND OF THE INVENTION

The invention relates to a process for the production of organically modified finely divided silica products by precipitation from silicate solutions which leads to products which are susceptible to a number of organic reactions.

It is known that silica can be precipitated with acids in the presence of suspensions of water insoluble organic polymers, such as, for example, rubber lattices, from water glass solutions, whereby so-called co-precipitates are obtained in which the individual components are so intimately mixed with each other that they are easily incorporated into, for example, a rubber sheet. However, the organic compound can be removed again with the aid of solvents.

SUMMARY OF THE INVENTION

It is the object of the invention to provide a process for the production of organically modified finely divided silicas by precipitation from silicate solutions with acids which leads to products in which the organic components cannot be washed out with water or organic solvents and which are susceptible to a large number of organic reactions.

The essence of the invention resides in that the precipitation of the silica from silicate solutions with the aid of inorganic acids ( preferably carried out at elevated temperatures and expediently at about 50° to 90° C ) is carried out in the presence of reactive water soluble organic polymers. Either alkaline or acid conditions can be maintained during the reaction. Suitable water soluble organic polymeric materials, for example, are: polyvinyl alcohol, polyethylene imine, polyacrolein, polymethacrylic acid, polyethylene oxide, polyvinyl pyrrolidone, polyvinyl-3-methyl-pyrrolidone, vinyl-pyrrolidone-vinyl-acetate copolymers, polyacrylamide and other water soluble polymers, polycondensates and polyaddition products, as well as their homologues and water soluble reaction products.

DESCRIPTION OF THE PREFERRED EMBODIMENTS

The process according to the invention can, for instance, be carried out by dissolving the water-soluble organic polymeric material in the solution in which the precipitation is to be effected before initiation of the precipitation. In general, a uniform incorporation of the organic polymer in the precipitating silica is effected. However, advantageously an aqueous solution of the organic polymer can be added gradually during the precipitation to ensure such uniform incorporation. The latter may be expedient in such instances when upon nucleus formation of the silica particles such large quantities of the organic material are already bound that the organic material content of the aqueous solution is prematurely exhausted, so that in the further growth of the modified silica particles, a practically pure silica shell is formed around the organically modified nucleus which is first formed. This, for instance, is the case in the embodiment of the invention when polyethylene imine is employed as the water soluble modifying agent. It also is possible to direct the process in such a way that the resulting particles consist of a pure silica nucleus and an organically modified shell, for instance, by appropriate delay in addition of the organic modifying agent.

The process according to the invention can be carried out in conventional apparatus used for silica precipitation and requires no additional apparatus, solvents or process steps. The precipitation is preferably carried out at a temperature of about 50° to 90° C.

The amount of initial polymer employed should be between 3 and 24 percent by weight relative to the weight of the precipitated silica. If less than 3 percent by weight are used, the results are unsatisfactory. The use of more than 24 percent is uneconomical and unnecessary.

The above-stated minimum weight is illustrated by Example 4 below and the maximum weight is shown in Example 2 (c).

Between 30 and 100 percent of the initially used polymer will appear in the precipitated final product. Within this range, the amount will vary depending on the specific method and polymer employed.

The modified silica products produced according to the invention are marked by the manner in which the organic polymers are firmly held in the silica particles. Thus, the organic component of the modified silica products according to the invention cannot be washed out with water, acids or organic solvents. The reactive groups of the organic polymers, for instance, amino, hydroxyl, carboxyl, amide or keto groups, remain completely reactive. As a consequence a number of reactions can be carried out at the surface of the modified silica products, such as, for example, substitutions, additions, salt formation which lead to other modified silica products. A substantial advantage of the process according to the invention resides in that they are susceptible to a large number of organic reactions. These reactions, depending upon the susceptibility of the reactive groups of the polymers employed cannot only be carried out after recovery of the precipitated modified silica product but rather can also be carried out in the precipitated suspension either during or after the precipitation. It is, of course, also possible to react the organic polymer with the further modifying agent before coprecipitation with the silica is initiated.

The modified silica products obtained according to the invention can be used as such or as intermediates in the fields of pigments, basic or acidic ion exchange agents, lacquer adjuvants, for instance, as delustering agents, free running adjuvants, fillers for polymers, for instance, silicone rubber with improved soft rolling properties and in reproduction papers. In addition, the products according to the invention can be further improved for a number of fields of use by reactive, substantive or leuco coloration.

The following examples will serve to illustrate the process according to the invention.

EXAMPLE 1 a. 20 g of polyvinyl alcohol (Moviol N 70–88) were dissolved in 1 liter of water and 65 ml of water glass containing 25.8 wt. percent of $SiO_2$ and 7.7 wt. percent of $Na_2O$ added thereto. The solution was heated to 82° C and a further 231 ml of water glass and 30 ml of concentrated $H_2SO_4$ added thereto very gradually. The addition of the water glass was over a period of 90 minutes and the addition of the $H_2SO_4$ was over a period of 130 minutes. At the end of the reaction the pH of the suspension was 2.5. One liter of water was added thereto and the precipitated product filtered off and carefully washed with water. The filter cake was dried for 24 hours at 70° C.

111 g of a finely divided silica product of the following analysis were obtained: C = 2.39 wt. percent, H = 1.51 wt. percent, residue after calcining 86.08 wt. percent, BET surface area 461 $m^2/g$, primary particle size about 10 – 80 m$\mu$, particles having porous surface (electron microscopic investigation).

Products with lower or higher C and H content can be obtained by varying the concentration of the polymer.

b. In an analogous test using only 5 g of polyvinyl alcohol (Moviol N 70–88), a product containing 1.33 wt. percent of carbon and 1.12 wt. percent of hydrogen was obtained.

c. When the precipitation was carried out in the presence of 50 g of the polyvinyl alcohol, the product contained 6.31 wt. percent of carbon and 1.12 wt. percent of hydrogen.

The products obtained are suitable for reactive dyeing according to Example 9; they can be used also as ingredients in lacquers, for instance, as coloured delustering media in transparent lacquers.

EXAMPLE 2 a. The procedure of Example 1 was repeated except that the polyvinyl alcohol was replaced by 10 g of a normal commercial 50 percent aqueous solution of polyethylene imine with an N content of about 16 percent (Polymin P produced by catalytic acid (cationic) polymerization of ethylene imine which is terminated by neutralization before water insolubility is reached). 114 g of a finely divided silica product of the following analysis were obtained: C = 2.35 wt. percent, H = 1.29 wt. percent, N = 1.53 wt. percent, residue on calcination 85.36 wt. percent, BET surface area 395 m$^2$/g, primary particle size 5 – 60 m$\mu$, particles finely porous.

b. 180 g of the 50 percent aqueous polyethylene imine solution were dissolved in 7 liters of water and 467 ml of water glass added thereto and the solution heated to 86° C. Then at this temperature a further 1370 ml of water glass and 195 ml of concentrated H$_2$SO$_4$ were added very gradually in such a way that the addition of the former was completed in 90 minutes and the latter in 120 minutes. When the addition of the sulfuric acid was completed the pH of the suspension was 2.5. The suspension was diluted with 5 liters of water and filtered. The filter cake was carefully washed out with water and dried at 70° C for 24 hours.

840 g of a finely divided silica product of the following analysis were obtained: C = 5.46 wt. percent, H = 2.18 wt. percent, N = 3.57 wt. percent, residue on calcination 77.48 wt. percent.

c. A precipitation carried out as described above using 488 g of 50 percent polyethylene imine gave 1010 g of a finely divided silica product of the following analysis: C = 10.60 wt. percent, H = 3.40 wt. percent, N = 6.24 wt. percent, residue on calcination 61.92 wt. percent.

The products obtained are suitable as thickening agents in aqueous systems.

EXAMPLE 3

When a precipitation was carried out analogously to that of Example 1 (a) but using an aqueous solution of polyacrolein in which 17 g of polyacrolein were dissolved with sodium bisulfite in 100 ml of water instead of the polyvinyl alcohol, 103 g of a finely divided silica product of the following analysis were obtained: C = 3.29 wt. percent, H = 1.44 wt. percent, residue on calcination 89.36 wt. percent, BET surface area 288 m$^2$/g, primary particle size 5 – 30 m$\mu$.

EXAMPLE 4

When a precipitation was carried out as in example 1 (a) but using 60 ml of a 5 wt. percent aqueous solution of sodium polymethacrylate instead of the polyvinyl alcohol, 99 g of a finely divided silica product of the following analysis were obtained: C = 1.84 wt. percent, H = 1.16 wt. percent, residue on calcination 89.45 wt. percent, BET surface area 475 m$^2$/g, primary particle size 5 – 50 m$\mu$.

EXAMPLE 5

50 g of polyvinyl pyrrolidone (Kollidon K 25 mol wt. 25,000) were dissolved in 10 liters of water and 700 ml of water glass added thereto. After heating to 85° C a further 2,050 ml of water glass and 200 ml of concentrated H$_2$SO$_4$ added gradually over a period of 90 minutes. Thereafter further H$_2$SO$_4$ was added gradually until a pH of 2.7 was reached. The precipitate was filtered off and carefully washed with distilled water and dried at 80° C. 1,086 g of a finely divided silica product of the following analysis were obtained: C = 2.82 wt. percent, H = 1.13 wt. percent, N = 0.85 wt. percent, residue on calcination 84.32 wt. percent, BET surface area 170 m$^2$/g.

b. Analogously when using 50 g of polyvinyl pyrrolidone of a molecular weight of about 38,000 (Luviskol K 30) 1,056 g of a finely divided silica product of the following analysis were obtained: C = 2.76 wt. percent, H = 1.24 wt. percent, N = 0.83 wt. percent, residue on calcination 86.1 wt. percent, BET surface area 166 m$^2$/g.

c. Analogously when using 100 g of polyvinyl pyrrolidone of a molecular weight of about 75,000 (Luviskol K 90) 1,103 g of a finely divided silica product of the following analysis were obtained: C = 6.66 wt. percent, H = 0.99 wt. percent, N = 1.46 wt. percent, residue on calcination 84.48 wt. percent, BET surface area 115 m$^2$/g.

d. Analogously when using 50 g of polyvinyl-3-methyl pyrrolidone-(2), 1,066 g of finely divided silica of the following analysis were obtained: C = 3.60 wt. percent, H = 1.55 wt. percent, N = 0.70 wt. percent, residue on calcination 89.56 wt. percent, BET surface area 262 m$^2$/g.

e. 40 g of polyvinyl pyrrolidone (Luviskol K 90) were dissolved in 12 liters of water. Then 1,075 ml of water glass and 102 ml of concentrated H$_2$SO$_4$ were added gradually to such solution at 50° C over a period of 30 minutes in such a way that the pH of the solution was maintained between 5 and 6. The resulting precipitate was filtered off, thoroughly washed and dried at 80° C. 426 g of finely divided silica of the following analysis were obtained: C = 6.34 wt. percent, H = 1.44 wt. percent, N = 1.38 wt. percent, residue on calcination 82.08 wt. percent, BET surface area 526 m$^2$/g.

These products after being grinded and cyclone classified are suited as delustering agents which do not separate. They also can be used as dyestuff (pigments) in substantive dyeing according to Example 8.

EXAMPLE 6

When precipitation was carried out analogously as in Example 5 (a) using 50 g of polyethylene glycol of an average molecular weight of 15,000 instead of the polyvinyl pyrrolidone and a precipitation temperature of 75° C, 1,040 g of a silica product of the following analysis were obtained: C = 3.54 wt. percent, H = 0.89 wt. percent, residue on calcination 89.94 wt. percent, BET surface area 342 m$^2$/g.

b. 25 g of polyethylene glycol 15,000 and 15 ml of concentrated H$_2$SO$_4$ were dissolved in 10 liters of water and after heating to 80° C gradually adding 120 ml of concentrated H$_2$SO$_4$ and 1,375 ml of water glass in 110 minutes in such a way that the starting pH of 1.4 gradually rose to 2.6. 489 g of silica of the following analysis were obtained: C = 2.48 wt. percent, H = 1.14 wt. percent, residue on calcination 90.99 wt. percent, BET surface area 512 m$^2$/g.

The products obtained are suitable as thickening agents in aqueous systems.

EXAMPLE 7 a. 700 ml of water glass were dissolved in 10 liters of water and 2,050 ml of water glass and 200 ml of concentrated H$_2$SO$_4$ added gradually at 85° C over a period of 95 minutes. After 70 minutes and continuing to the end of the 95 minute period, 90 g of polyethylene imine in 500 ml of water were also added gradually. Thereupon the reaction mixture was acidified to a pH of 2.6 with about 70 ml of concentrated H$_2$SO$_4$. The precipitate was filtered off, thoroughly washed and dried at 80° C. 1,062 g of silica of the following analysis were obtained: C = 2.51 wt. percent, H = 1.36 wt. percent, N = 1.49 wt. percent, BET surface area 235 m$^2$/g.

b. The procedure under (a) was repeated to the acidification to a pH of 2.6. Then the reaction mixture was neutralized with sodium bicarbonate to a pH of 6.5 and then 40 g of the reactive dye Procion-Brilliant-Red M–8 B S (ICI) quickly added thereto at 80° C while stirring intensively. The stirring was continued for 30 minutes after such addition and the precipitate thereupon filtered off and thoroughly washed. After drying at 80° C, 1,090 g of an intensive red dyed silica were obtained. The dye was bound reactively and could not be removed by several hours boiling in water.

c. The procedure under (b) was repeated using the reactive dye Drimaren-gold yellow-Z-R (Sandoz). 1,087 g of a gold yellow dyed silica were obtained in which the dye was bound reactively.

Similar reactive dyes were also obtained with Remazol brilliant violet 5 R (Hoechst) and Solidazol-Brilliant rubin RR (Casella).

d. The procedure under (a) was repeated to the acidification to a pH of 2.6. Then the reaction mixture was neutralized to a pH of 6.0 with sodium bicarbonate and then 100 g of crystallized copper sulfate dissolved in water added thereto. A stable copper complex formed on the surface of the precipitated silica. After filtering, thoroughly washing and drying, 1,135 g of a light blue colored silica of the following analysis were obtained: C = 2.37 wt. percent, H = 1.37 wt. percent, N = 1.50 wt. percent, Cu = 1.78 wt. percent. The bound copper could not be removed with water, aqueous ammonia or organic acid and could only be removed with strong mineral acids, such as, HCl.

e. The procedure of (b) was repeated to the neutralization to a pH of 6.5 and then 40 g of the acid dye Alizarin pure blue B added thereto. After filtering, washing and drying, 1,082 g of a blue dyed silica were obtained in which the dye was bound in the modified silica as a salt.

f. The procedure of (d) was repeated to the neutralization to a pH of 6.0 and then 45 g of 2,4-diamino-6-chlorotriazine added thereto at 80° C while stirring. The stirring was continued for 1 hour and the precipitate then filtered off, washed and dried. A silica filler product was obtained in which the diamino triazine group was reactively bound on the surface. The analysis was as follows: C = 3.40 wt. percent, H = 1.40 wt. percent, N = 2.22 wt. percent.

g. The procedure of (d) was repeated to the neutralization to a pH of 6.0 and then 40 g of powdered maleic acid anhydride added thereto at 85° C. After 30 minutes stirring the precipitate was filtered off, washed and dried. 1,068 g of a finely divided modified silica were obtained in which maleic acid was bound at the surface as monoamide. The analysis was as follows: C = 3.10 wt. percent, H = 1.39 wt. percent, N = 1.38 wt. percent, BET surface area 210 m²/g.

h. The procedure under (a) was repeated to the acidification to a pH of 2.6. Then the reaction mixture was neutralized to a pH of 6.2 and 100 g of a 40 wt. percent formalin solution added thereto. After 30 minutes 80 g of urea and 20 g of oxalic acid were added whereupon the pH dropped to 3.6. The mixture was then stirred for 3 hours at 60° C and allowed to stand over night. The precipitate was then filtered off, washed and dried. 1,070 g of a modified silica filler in which the urea is bound to the filler surface over methylene bridges were obtained. The analysis was as follows: C = 3.63 wt. percent, H = 1.46 wt. percent, N = 3.10 wt. percent, BET surface area 215 m²/g.

i. The procedure under (a) was repeated to the acidification to a pH of 2.6 and then 200 g of a polyacrolein-bisulfite solution (polyacrolein content 20 wt. percent) added thereto while stirring. After filtering, washing and drying, 1,094 g of a modified silica filler of the following analysis were obtained: C = 4.62 wt. percent, H = 1.70 wt. percent, N = 1.76 wt. percent, BET surface area 130 m²/g.

The products obtained are suitable as thickening agents in aqueous systems and as dyestuffs (pigments), as ion exchanger and as reactive ingredients in lacquers.

EXAMPLE 8 a. Precipitation with polyvinyl pyrrolidone (mol wt. 25,000) was carried out as in Example 5 (a) and after the precipitation ended, a solution of 10 g of substantive dye Benzo pure blue S in 2 liters of water were added thereto. The mixture was stirred for a further 30 minutes at 85° C and the precipitate filtered off, washed and dried. 1,083 g of an intensive blue dyed silica filler were obtained.

b. Precipitation was carried out as under (a) and after precipitation ended a solution of 10 g of the leuco vat dye ester Indigosol green IB (F) (powder) in 500 ml water added thereto. The mixture was then held at 85° C for a further 5 minutes and the precipitate then filtered off, washed and suspended in 10 liters of water in which 20 ml of concentrated $H_2SO_4$ and 20 g of sodium nitrite had been added.

The modified silica filler was dyed in intensive green. The oxidation of the dye ended in 30 minutes and the dyed filler then filtered off, washed and dried.

The products are suited as dyestuffs (pigments).

EXAMPLE 9

Precipitation with polyvinyl alcohol was carried out as in Example 1 and after the precipitation ended 30 g of the reactive dye Brilliant orange 2 RS (ICI) added thereto at 80° C and the mixture stirred for a further 30 minutes. After filtering, washing and drying an intensively dyed silica filler was obtained.

The products are suited as dyestuffs (pigments).

EXAMPLE 10

On working as stated in Example 5 (a), but using 50 g of cationic starch instead of the polyvinyl pyrrolidone 1035 g of a finely divided silica of the following analysis were obtained: C = 1.54 wt. percent, H = 1.11 wt. percent, residue on calcination = 90.80 wt. percent.

The modified silica obtained is very well suited as auxiliary agent in lacquering or textile finishing.

The following table illustrates the ratio of water glass employed to the amount of silica obtained. Referring, for instance, to Example 1, it will be noted that there were employed an initial amount of 65 ml of water glass solution to which there were added additional 231 ml water glass solution. This gave a total of 296 ml of water glass which based on the density of 1.351 corresponding to a g-amount of 400 g.

The silica contents present in the solution was 25.8 percent corresponding to a weight of 103 g. This resulted in a silica contents after calcination of 96.3 g.

The amounts for the other examples have been calculated in a similar manner.

| Example | water glass (ml) | water glass (g) | SiO₂ present in the solution (in g) | SiO₂ present in final product after calcination (in g) |
|---|---|---|---|---|
| 1(a) | 296 | 400 | 103 | 96.3 |
| 2(a) | 296 | 400 | 103 | 97.3 |
| 2(b) | 1,837 | 2,480 | 640 | 650 *) |
| 2(c) | 1,837 | 2,480 | 640 | 625 |
| 3 | 296 | 400 | 103 | 92 |
| 4 | 296 | 400 | 103 | 88.6 |
| 5(a) | 2,750 | 3,720 | 959 | 915 |
| 5(b) | 2,750 | 3,720 | 959 | 908 |
| 5(c) | 2,750 | 3,720 | 959 | 933 |
| 5(d) | 2,750 | 3,720 | 959 | 955 |
| 5(e) | 1,075 | 1,440 | 371 | 349 |
| 6(a) | 2,750 | 3,720 | 959 | 936 |
| 6(b) | 1,375 | 1,858 | 479 | 446 |

*) 1.5 % too much

It will be understood that each of the elements described above, or two or more together, may also find a useful application in other types of inventions or discoveries differing from the types described above.

While the invention has been illustrated and described as embodied in the production of finely divided organically modified silicas, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In the process for the production of a finely divided organically modified silica in which the silica is precipitated by adding an inorganic acid at an elevated temperature to an aqueous alkali metal silicate solution, the improvement which comprises carrying out the precipitation of the silica in contact with a water soluble reactive organic polymer selected from the group consisting of polyvinyl alcohol, polyethylene imine, polyacrolein, polymethacrylic acid, polyethylene glycol, polyvinyl pyrrolidone, polyvinyl-3-methyl-pyrrolidine, vinyl pyrrolidone-vinyl acetate copolymers and polyacrylamide, the organic polymer being present in an amount of from about 3 to about 24 percent by weight relative to the weight of the precipitated silica.

2. The process of claim 1 in which the water soluble reactive organic polymeric materials is dissolved in the aqueous silicate solution before the precipitation of the silica is ended.

3. The process of claim 2 in which the reactive water soluble organic polymeric material carries at least one reactive group selected from the group consisting of amino, amido, hydroxyl, carboxyl and keto groups.

4. The process of claim 2 in which the precipitation is carried out at a temperature of about 50° to 90° C.

5. The process of claim 3 comprising in addition dyeing the thus obtained modified finely divided silica.

6. A finely divided organically modified silica produced by the process of claim 1.

* * * * *